(12) United States Patent
Huster et al.

(10) Patent No.: US 6,871,729 B2
(45) Date of Patent: Mar. 29, 2005

(54) MASTER CYLINDER FOR A BRAKE OR CLUTCH OF A MOTORCYCLE OR BIKE

(75) Inventors: Michael Huster, Bergamo (IT); Andrea Stuhler, Bergamo (IT); Roberto Bonfanti, Bergamo (IT)

(73) Assignee: Freni Brembo S.p.A., Curno (IT)

( * ) Notice: Subject to any disclaimer, the term of this patent is extended or adjusted under 35 U.S.C. 154(b) by 0 days.

(21) Appl. No.: 10/468,920

(22) PCT Filed: Mar. 2, 2001

(86) PCT No.: PCT/IT01/00103

§ 371 (c)(1),
(2), (4) Date: Dec. 31, 2003

(87) PCT Pub. No.: WO02/070315

PCT Pub. Date: Sep. 12, 2002

(65) Prior Publication Data

US 2004/0118641 A1 Jun. 24, 2004

(51) Int. Cl.[7] ............................................. B60T 17/00
(52) U.S. Cl. ...................... 188/24.11; 188/344; 60/594
(58) Field of Search ............................. 188/24.11, 344; 60/594

(56) References Cited

U.S. PATENT DOCUMENTS

| 3,802,200 A | | 4/1974 | Kolm | |
|---|---|---|---|---|
| 4,162,616 A | * | 7/1979 | Hayashida | .................... 60/533 |
| 4,176,886 A | * | 12/1979 | Watanabe | .................. 303/9.64 |
| 4,635,442 A | * | 1/1987 | Bass | ........................... 60/594 |
| 4,823,553 A | | 4/1989 | Reynolds | |

FOREIGN PATENT DOCUMENTS

DE          19752076 A1     5/1999

* cited by examiner

Primary Examiner—Matthew C. Graham
(74) Attorney, Agent, or Firm—Hogan & Hartson LLP

(57) ABSTRACT

A brake/clutch master cylinder for a motorcycle/bicycle or the like, with a body which is produced by moulding of plastics material reinforced by glass fibre without the need for machining operations or metal inserts and which forms, together with the cylindrical shell of the master cylinder, a hydraulic-fluid reservoir, a coupling sleeve for a male quick-fit hydraulic connector, and a seat for fixing to a handlebar, the body having a high degree of structural stiffness with respect to working stresses and adequate resilience for impact stresses imparted to the body by means of the hand operating lever.

7 Claims, 4 Drawing Sheets

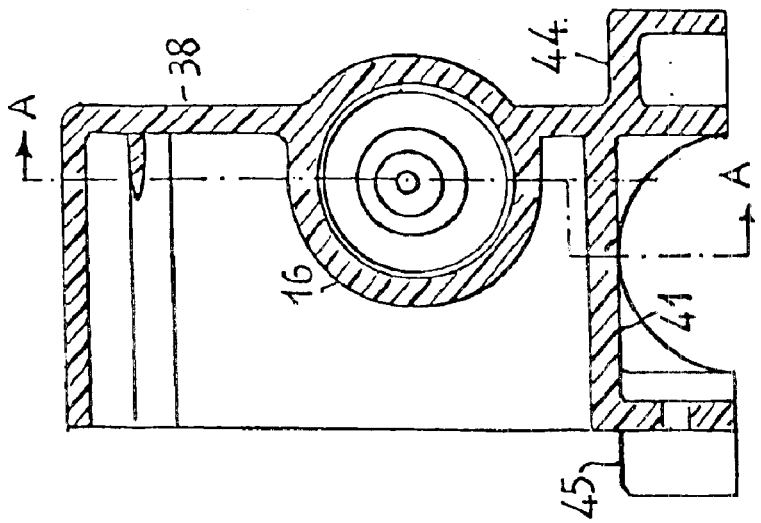
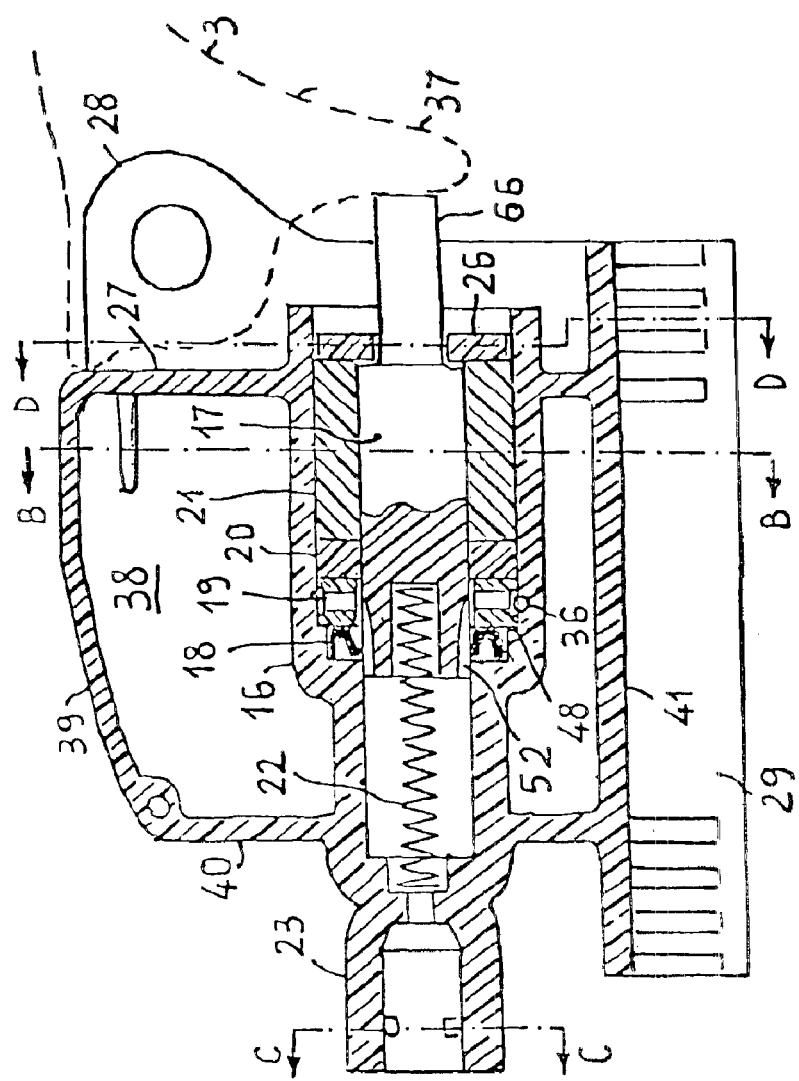
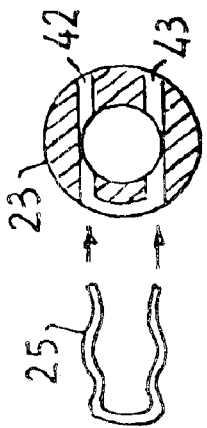

MASTER CYLINDER FOR A BRAKE OR CLUTCH OF A MOTORCYCLE OR BIKE

FIELD OF THE INVENTION

The present invention relates to a brake or clutch master cylinder to be mounted on the handlebars of a motorcycle, bicycle, or the like.

BACKGROUND OF THE INVENTION

It is known that hydraulic braking systems are being used ever more widely in light vehicles such as motorcycles and bicycles.

For these vehicles, the control or master actuator has to satisfy various requirements including: low cost, light weight, resistance to atmospheric agents, impact strength and an ability to withstand high working stresses, ease of installation on and removal from the vehicle, ease of connection to the braking system, as well as ease of replacement of the mechanical hand-operating element constituted by the hand lever which is most exposed to knocks and to the risk of breakage that does not prejudice the functionality of the other parts of the braking system.

STATE OF THE ART

In order to satisfy at least some of these requirements, it has been proposed, as described in U.S. Pat. No. 3,802,200, to produce the control actuator (master cylinder) by the moulding of plastics material, with a small number of parts and machining operations, which are, however, necessary, and to associate a hydraulic-fluid reservoir with the actuator.

A structure which is light, relatively inexpensive, and resistant to atmospheric agents is thus produced, but the other requirements are not adequately satisfied.

In particular, the desirable strength of the cylinder and of the structure with respect to working stresses and to knocks is not achieved. Moreover, any repairs are difficult because they involve the risk of loss of hydraulic fluid.

To achieve greater strength of the cylinder body, it has been proposed, for motor vehicles, as described in the document EP 0185165, to make the body of plastics reinforced by a metal core, with clear constructional complications and increased cost.

Alternatively, as described in U.S. Pat. No. 5,121,686, it has been proposed to form the cylinder body in plastics reinforced with glass fibres, thus in practice excluding the possibility of subsequent machining operations, to avoid which it is necessary to resort to complications in the moulding process and to constructional and production complications in order to produce the elements for connection to the hydraulic circuit.

All of this is detrimental to cost and to ease of installation, setting-up, and repair, if necessary.

It should be added that these last two documents do not take account of the particular characteristics of motorcycle brake or clutch operating devices, which are hand operated and in which the device is subjected to risks of knocks and to working stresses quite different from those which arise in vehicle master cylinders, which are subjected substantially to purely axial stresses.

SUMMARY OF THE INVENTION

The disadvantages of the prior art are overcome and all of the requirements desirable for a motorcycle or bicycle brake are achieved by the brake (or clutch) master cylinder of the present invention in which the cylinder body is produced by moulding of plastics material reinforced with glass fibre, without constructional complications, without the need for machining operations, and without the need for auxiliary elements for connection to the hydraulic circuit, or for metal inserts.

Connection to the hydraulic circuit is achieved by a simple seat for a male quick-fit connector restrained by a clip and the same clip system is used to render the hydraulic piston and its accessories captive in its seat.

The cylinder body also incorporates a hydraulic-fluid reservoir the walls of which strengthen the structure of the body and provide a rigid frame for the anchorage of two support lugs of the articulation pin of the operating lever and for a seat for fixing to the handlebar of the vehicle.

A strong and compact structure which takes up little space, which has good stiffness and ability to withstand working stresses and which, at the same time, is relatively resilient and able to absorb stresses resulting from possible knocks is thus produced, in combination with considerable ease of installation, of setting-up of the hydraulic system, and of repair if necessary, and with an extremely low cost.

BRIEF DESCRIPTION OF THE DRAWINGS

The features and advantages of the invention will become clearer from the following description of a preferred embodiment, given with reference to the appended drawings, in which:

FIG. 3 is a view of the cylinder of FIG. 1, in section, from above (with reference to the view of FIG. 1), FIG. 3A is a detail view showing, in diametral section, a component of the cylinder of FIG. 1 for locating a primary seal and at the same time completing a supply path for the hydraulic fluid, FIG. 4 is a section, taken on the line C—C of FIG. 3, through a constructional detail of the cylinder, FIG. 5 is a section, taken on the line B—B of FIG. 3, through the body of the cylinder of FIG. 1.

DETAILED DESCRIPTION OF A PREFERRED EMBODIMENT

Figure 1:
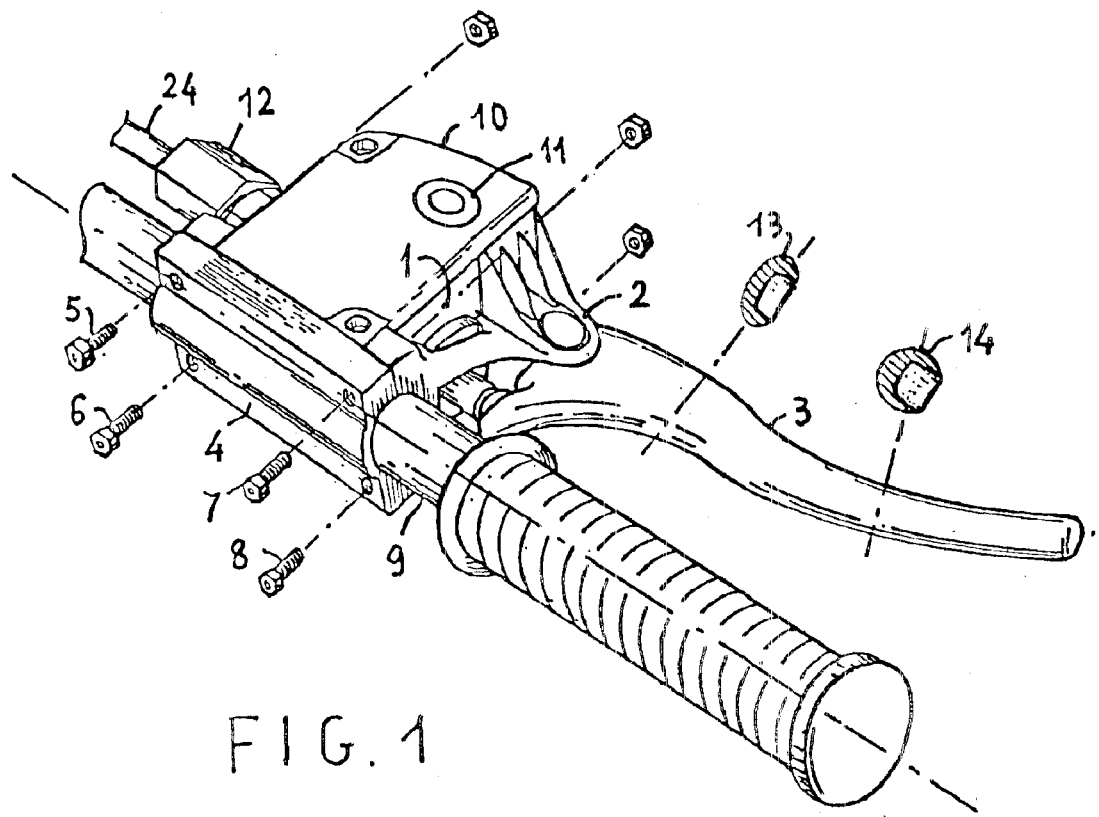
FIG. 1 is a perspective view of a cylinder unit formed in accordance with the present invention and fitted on a vehicle handlebar.

FIG. 1 is an overall perspective view of a preferred embodiment of the motorcycle brake or clutch master cylinder unit fitted on a motorcycle handlebar.

The unit comprises a body 1 having a pair of lugs, of which only one, indicated 2, is visible in the drawing, and between which an operating lever or handle 3 is articulated, the body 1 also having a fixing seat connected, by means of fixing screws 5, 6, 7, 8, (which have respective nuts, or are even self-tapping screws), to a complementary seat 4 in order to fix the unit to the handlebar 9.

The cylinder of the master cylinder unit (in which the piston and its sealing members are housed) is formed inside the body 1 and the body 1 at the same time forms a hydraulic-fluid reservoir which is in communication with the interior of the cylinder and is closed by a removable lid 10 with a plug/window 11 for checking the hydraulic-fluid level and possibly topping it up.

The body also has a hydraulic outlet constituted by a cylindrical housing which is in communication with the chamber of the cylinder and in which a male quick-fit connector 12, which is connected, directly or by means of a male screw, to a pipe 24 for connection to the brake or clutch actuator member, is engaged.

The unitary body 1 is produced by moulding of plastics material reinforced with glass fibre, preferably polyamide or polystyrene resin with 30% of glass fibre, and constitutes a generally rectangular parallelepipedal box structure which is rigid and able to withstand the pressures developed by the operation of the cylinder as well as the stresses which the lever/handle imparts, when it is operated, to the body 1, by means of the articulation restraint 15 and the interaction between the lever and the piston.

These stresses, which act in the plane defined by the lever and the handlebar, that is, in the plane perpendicular to the axis of pivoting of the lever (the articulation axis), are discharged, through the body and its fixing seat, onto the handlebar 9 which transfers equivalent and opposite restraint reactions to the body.

These aspects will be discussed in greater depth below.

It is appropriate here to consider another aspect: in the event of a fall, the lever 3 is particularly exposed to especially violent stresses transverse the above-defined plane which, as often occurs in braking devices of the prior art, may cause breakage of the lever or, worse, of the lever support structure.

It is therefore advisable for the unit to have a predetermined resilience with respect to these stresses so as to absorb the instantaneous stresses developed by the impact, to damp them, and to regain its original, undeformed configuration.

This result is achieved by a series of measures.

1) The lever 3, like the body 1, is also preferably made of plastics material filled with glass fibre and therefore, although it is strong and quite rigid, has greater resilience than the light casting or forging alloys commonly used for the production of the lever, which are either very brittle and break easily or are very plastic and bend easily beyond the yield point, undergoing permanent deformation.

2) The resilient effect of the plastics material of which the lever is made is enhanced by an appropriate configuration of its cross-section which ensures good stiffness for normal operative stresses in the plane perpendicular to the axis of the lever, but less stiffness for stresses transverse this plane.

In particular, as shown in FIG. 1, in the vicinity of the articulation restraint 15, the cross-section 13 of the lever is approximately oval (and advantageously recessed and provided with ribs on the face not visible in the drawing) with a greater moment of inertia relative to the neutral axis parallel to the articulation axis and a lesser moment of inertia relative to the neutral axis perpendicular to the former neutral axis. In the region farthest from the articulation restraint, however, the cross-section 14 of the lever is approximately circular (and possibly recessed on the side which is not visible) for a more comfortable grip.

3) The support lugs of the articulation restraint 15 have good resistance to tension/compression stresses in the plane perpendicular to the articulation axis and discharge them through the side wall of the body 1 onto the lower wall or base of the body and through the body to the fixing seat and to the handlebar.

Conversely, stresses transverse the plane perpendicular to the articulation axis bring about a resilient twisting of the side wall of the body 1 on which the lugs are positioned and a corresponding bending/twisting of the lower wall and of the other walls, with a neutral axis oriented in the direction in which the moment of inertia of the cross-section is lowest. These aspects will be explained further below.

Figure 2:
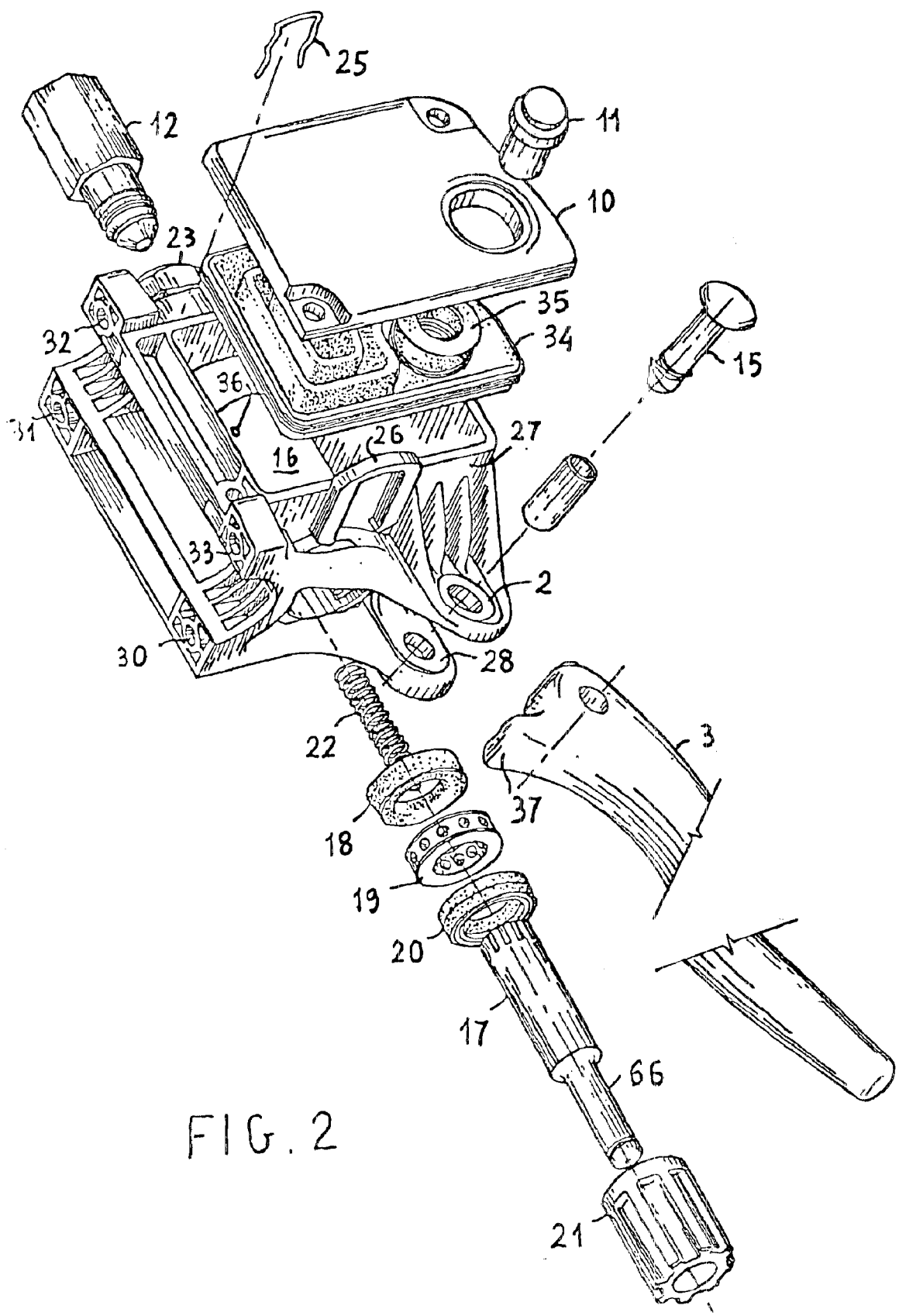
FIG. 2 is an exploded view of the cylinder of FIG. 1.

FIG. 2 shows the cylinder unit of FIG. 1 in an exploded view, for greater clarity.

A cylindrical shell 16 moulded in the body 1 is open at one end and forms the pressure chamber of the cylinder, with an inner portion, relative to the open end, having a diameter equal to that of a piston 17, and an outer portion of larger diameter suitable for housing, in order, a primary seal 18, a spacer 19, a secondary seal 20, and a guide sleeve 21 for the piston 17.

A compression spring 22 is fitted between the closed end of the chamber and the head of the piston 17.

The closed end of the chamber has an opening (not visible in the drawing) communicating with the interior of a hydraulic coupling sleeve 23 in which a male quick-fit hydraulic connector 12 is engaged and held in its seat by a forked locking element 25 engaged by sliding in suitable holes moulded in the sleeve 23.

Similarly, once the piston 17 and its accessories have been fitted in the pressure chamber, they are restrained in the chamber by a forked locking element 26 engaged by sliding in suitable holes moulded in the shell 16. Only the rod 66 for operating the piston 17, which has a smaller diameter than the piston, projects freely from the shell in order to interfere with a thrust appendage 37 of the lever 3.

The body 1 as a whole constitutes a box structure configured approximately as a rectangular parallelepiped, containing more than half of the shell 16 and forming a hydraulic-fluid reservoir with a base, not visible, constituted partially by the shell 16, and side walls on one 27 of which the lugs 2, 28 for the articulated restraint of the lever are positioned, reinforced by suitable ribs.

A seat 29 for fixing to the handlebar, positioned on another wall of the reservoir and on the base, is moulded integrally with the body 1 and has suitable recesses for reducing weight, and through-seats 30, 31, 32, 33 for the fixing screws (5, 6, 7, 8 in FIG. 1).

The reservoir is closed by the lid 10 after the interposition of a bellows-like pressure-compensation diaphragm 34 between the lid and the side walls of the reservoir with a filling/topping-up opening 35 connected to a corresponding opening of the reservoir and closed by a plug/window 11. The reservoir is in communication with the pressure chamber through one or more holes such as the hole 36 formed by a mould pin. FIG. 3 shows the body 1 in section, with a view from above and in composite section (a median section through the body 1 in the lower portion and a diametral section through the cylindrical shell 16 of the pressure chamber, as indicated by the section line A—A of FIG. 5), with the various components of the master cylinder housed in the shell 16 and identified by the same reference numerals are used in FIG. 2.

It can be noted that the base 38 of the reservoir, the peripheral walls 27, 39, 40, 41 of which can be compared to reinforcing ribs, constitutes, together with the shell 16, a rigid structure which is particularly able to withstand stresses oriented in the plane of the drawing, and on which the lugs such as 28 and the fixing seat 29 are positioned.

It will also be noted that the side 39 of the reservoir is not straight but is constituted by two portions which are slightly inclined to one another (or alternatively is slightly curved) for the reasons which will be made clearer below.

With regard to the actuator member, it will be noted that it is of the type with a piston which is slidable on the seals, rather than with seals slidable with the piston in the cylinder.

This ensures a much longer useful life of the seals and improved sealing since the piston can be moulded of non-filled plastics material so as to ensure dimensional accuracy and better surface finishing than can be achieved by the moulding of plastics material rein forced with glass fibre.

In order to operate correctly, the primary seal 18 which is of the type with two lips acting on the piston and on the cylindrical wall of the chamber, respectively, must be subjected to controlled or zero axial compression.

The pressure chamber therefore has an abutment step 48 for the spacer 19 for ensuring its correct axial positioning and controlling the axial compression exerted on the seal.

Alternatively, instead of the step 48, the axial positioning of the primary seal 18 may simply be achieved by the positioning of the forked locking element 26 which takes up the dimensional tolerances of the spacer 19, of the secondary seal 20, and of the guide sleeve 17 in an axial direction so as to impose a controlled maximum compression on the primary seal.

The spacer 19 has the dual functions of preventing axial movements of the primary seal 18 (due to the pressure developed in the pressure chamber) and of establishing a connection between the pressure chamber and the supply hole (or holes) 36 when the piston is at rest.

For this purpose, as can be seen more clearly in FIG. 2 and in the section of FIG. 3A, the spacer in the form of a cylindrical ring has, on its outer cylindrical wall, an annular recess 49 and radial holes 50 for communication between the outer annular recess 49 and the interior of the ring. The two end walls 51, 62 of the cylindrical ring, however, are flat and continuous. With this arrangement of the recess, the height of the step 48 in the pressure chamber, if a step is provided, can be kept very small and sufficient to ensure the abutment of the spacer 19 which, with its end surface 51, ensures continuous support for the primary seal 18 when the seal 18 is subjected to pressure.

It is thus possible to ensure minimal radial dimensions of the spacer 19, the secondary seal 20, and the sleeve 21, even in the presence of the step 48, consequently also limiting the radial dimension of the shell 16.

Clearly the spacer is positioned axially in the shell in a manner such that the annular recess 49 is located in the region of the supply hole 36 and the piston 17 has, at its end, in known manner, longitudinal grooves 52 which put the pressure chamber into communication with the interior of the spacer ring when the piston is at rest.

FIG. 4 shows, in a section taken on the line C—C of FIG. 3, the constructional detail of the body 1 constituted by the sleeve 23 for hydraulic coupling with a male quick-fit hydraulic connector.

Two parallel holes 42, 43 extend through the sleeve 23 for receiving the forked locking element 25 which is advantageously shaped for engagement in a locking groove of the male hydraulic connector 12.

FIG. 5 shows the body 1 in a section taken on the line B—B of FIG. 3 and shows its structure which encloses both the reservoir and the pressure chamber in a compact space.

It also shows clearly that the wall 41 of the reservoir which is provided with a pair of brackets or appendages 44, 45 that are advantageously recessed to ensure a uniform combined thickness with considerable stiffness, itself at least partially constitutes the seat 29 for fixing to the handlebar, so that the stresses exerted by the lever 3 on the body 1 by means of the lugs are discharged directly onto the fixing seat.

The further advantage of a saving in material (to which the incorporation of the shell 16 in the reservoir as a partial constituent of the base 38 of the reservoir contributes), and of the consequent reduction in weight of the unit, is thus also achieved.

Figure 6:
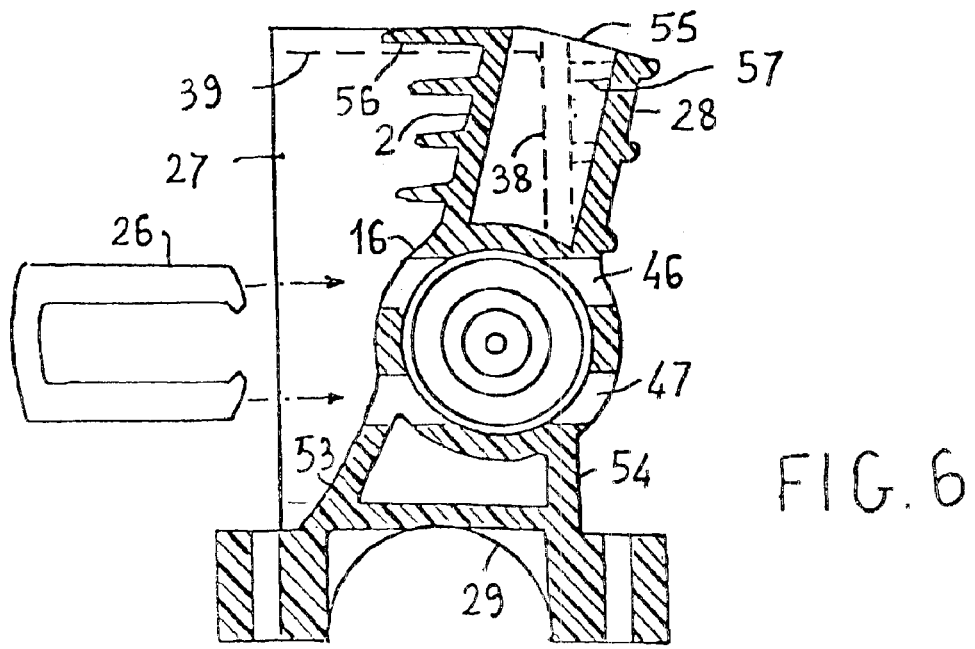
FIG. 6 is another section through the cylinder body, taken on the line D—D of FIG. 3.

FIG. 6 shows the body 1 in a section taken on the line D—D of FIG. 3, basically to make clear two aspects.

$1^{st}$) The open end of the cylindrical shell 16 projects outside the reservoir wall 27 and two parallel holes 46, 47 extend through it for receiving the forked locking element 26 which is advantageously made of glass-fibre-reinforced plastics, and which prevents the sleeve 21 and the piston 17 from slipping out of the shell 16.

The distance between the prongs of the forked element 26 is nevertheless sufficient to allow the actuation rod 66 to pass freely.

Even if the lever 3 is removed in order to be replaced in the event of breakage, the sleeve and the piston are thus prevented from slipping out of the shell 16, with a consequent leakage of hydraulic fluid, when the retaining effect is no longer exerted by the appendage 37.

$2^{nd}$) The lugs 2, 28, disposed on either side of the plane of the base 38, are connected to the fixing seat 29 by two continuous ribs 53, 54 which include the portion of the shell 16 that projects from the reservoir wall 27.

Figure 7:
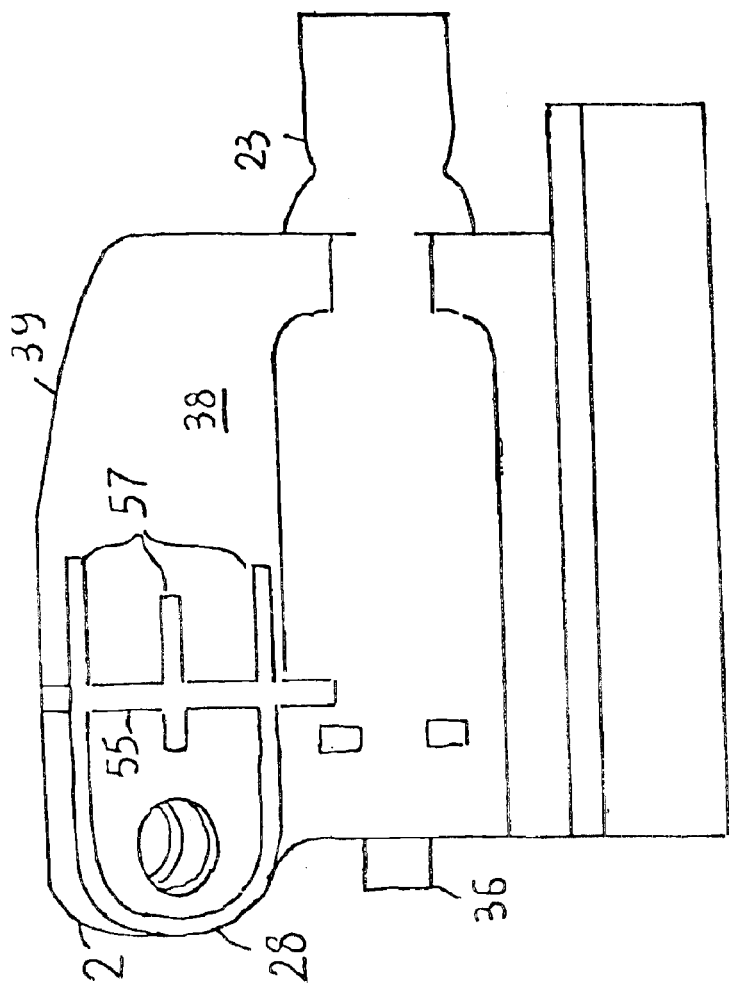
FIG. 7 is a view of the cylinder body of FIG. 1 seen from the opposite side to the view of FIG. 3.

The lugs 2, 28 are positioned, respectively, on the wall 27 and on a suitable extension 55 thereof, visible more clearly in FIG. 7.

Reinforcing ribs 56, 57 stiffen the connection between the lug 2 and the wall 27 and between the extension 55 and the base wall 38, respectively.

A structure is thus produced which is particularly capable of withstanding stresses acting in the plane perpendicular to the articulation axis, which are discharged through the ribs and the base 38 of the reservoir onto the support seat, with minimal deformation.

The situation which arises when the structure is subjected to a twisting or bending stress due, for example, to a force resulting from an impact, applied to the lever and oriented in a plane extending through the articulation axis, is completely different.

Figure 8:
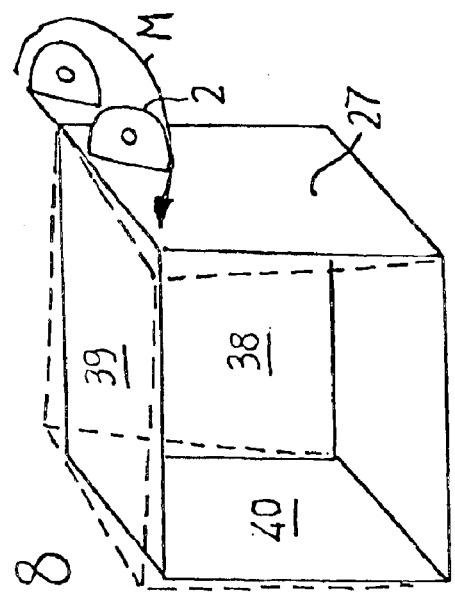
FIG. 8 is a schematic perspective view of the structure formed by the cylinder body of FIG. 1.

This situation is shown schematically in the axonometric view of FIG. 8.

If a bending moment, represented by the arrow M, is applied to the lugs 2, 28 through the articulation restraint, the lugs tend to bend and, by means of the ribs, apply a twist to all of the walls of the reservoir but particularly to the side 27 on which the lugs are positioned and to the base 38, which tend to be disposed in the position indicated in broken outline.

Clearly, the moment of inertia of the box structure and in particular of the cross-section of the side 27 and of the cross-section of the base 38 is minimal for stress in this direction.

However, the other walls also contribute to the stiffness of the system.

Figure 9:
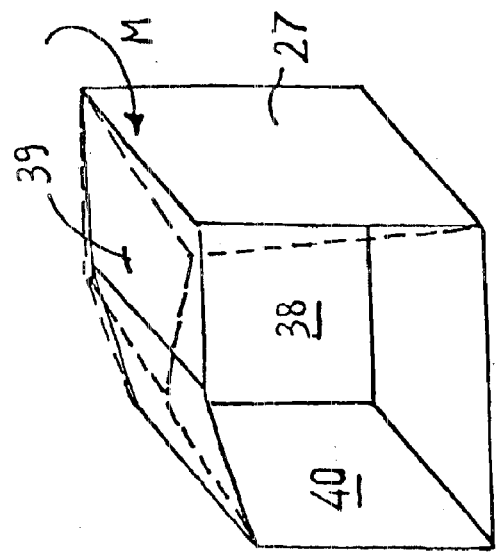
FIG. 9 is a second schematic view of the structure formed by the cylinder body of FIG. 1, improved in accordance with the preferred embodiment, to achieve greater torsional resilience.

This contribution (as shown schematically in FIG. 9) can preferably be minimized by disconnecting the other walls, for the purposes of the twisting stress, which involves a degree of compression of the straight wall 39 between the wall 27 stressed by the lug 2 and the wall 40 which tends to offer resistance.

In other words, the wall 39 can be compared to some extent to a rod loaded at a point.

However, as already stated, the wall 39 is preferably curved (or is even composed of two portions inclined to one another) so that, even in the presence of a compression force below the critical load, it tends to bend, rendering the reaction of the wall 40 to the deformation of the wall 27 minimal. The structure can therefore resiliently absorb torsional stresses resulting from an impact.

The foregoing description relates purely to a preferred embodiment and it is clear that many variations may be adopted without departing from the scope of the invention.

For example, the sleeve 17 (FIG. 3) may have, at its end which bears on the forked element 26, a constriction which, independently of the forked element 26, prevents the piston 17 from coming out of its seat, without interference with the rod 66.

Moreover, instead of forming a cylindrical seat of uniform diameter as shown in FIG. 3, the sleeve 23 may form an inner cylindrical seat of smaller diameter for housing the end of a male hydraulic connector and a respective seal with a minimal diameter.

This is in order to reduce to the minimum the axial stress developed by the pressure when the brake is operated.

The outer part of the cylindrical seat, on the other hand, may have a larger diameter to ensure the necessary mechanical strength and manipulability of the axial locking system.

What is claimed is:

1. A brake or clutch master cylinder for a motorcycle/bicycle, of the type in which a body mounted on a handlebar forms a): a cylindrical shell for holding hydraulic fluid, closed by a piston which is operated by a hand lever in order to transfer the hydraulic fluid held in the shell to an actuator device, and b): the walls of a hydraulic-fluid reservoir communicating with the interior of the shell, wherein:

the body is produced by moulding of plastics material reinforced with glass fibre, with the exclusion of any machining operations or metal inserts, the body has a sleeve forming a housing communicating with the interior of the cylindrical shell for the insertion of a male quick-fit hydraulic connector, locked axially by a first forked locking element inserted in at least one through-hole in the sleeve, the piston being held captive in the shell by a second forked locking element inserted in through-holes in the shell, the shell is partially contained in the volume of the reservoir with the axis of the cylindrical shell extending through the volume of the reservoir, and the walls of the reservoir form a support structure for two lugs on which the hand lever is articulated, and for a seat for the fixing of the body to a handlebar.

2. A master cylinder according to claim 1 in which the body has a sleeve forming a housing, communicating with the interior of the cylindrical shell, for the insertion of a male quick-fit hydraulic connector, locked axially by a second forked locking element inserted in at least one through-hole in the sleeve.

3. A master cylinder according to claim 1 or claim 2 in which the hand lever is made of plastics reinforced with glass fibre and the cross-section of the lever in the vicinity of the articulation lugs has a greater moment of inertia for stresses acting in the plane perpendicular to the articulation axis than it has for stresses transverse that plane.

4. A master cylinder according to claim 1 in which the walls of the reservoir form a support structure for the lugs which has a greater stiffness with respect to stresses acting in the plane perpendicular to the articulation axis than it has with respect to stresses transverse that plane.

5. A master cylinder according to claim 4 in which the walls of the reservoir comprise a base, and a first side wall and a second side wall which are adjacent, flat and perpendicular to one another and to the base, as well as a third side wall and a fourth side wall which are perpendicular to the base and opposite the first and second walls, respectively, and in which:

the first side wall constitutes part of the fixing seat, and the lugs are positioned on the second side wall and on an extension of the second wall, on one side and on the other side of the plane of the base, respectively.

6. A master cylinder according to claim 5 in which the third wall is formed by at least two portions which are perpendicular to the base and are inclined to one another.

7. A master cylinder according to claim 1 in which a primary seat housed in the shell is held in position in the shell axially by a spacer element in the form of a cylindrical ring with flat and continuous ends, the cylindrical ring having an annular recess in its outer wall and radial holes for putting the annular recess into communication with the interior of the cylindrical ring.

* * * * *